(12) United States Patent
Gilfix

(10) Patent No.: US 8,312,383 B2
(45) Date of Patent: Nov. 13, 2012

(54) MASHUP APPLICATION PROCESSING SYSTEM

(75) Inventor: Michael Gilfix, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 12/509,133

(22) Filed: Jul. 24, 2009

(65) Prior Publication Data

US 2011/0022955 A1    Jan. 27, 2011

(51) Int. Cl.
G06F 3/048 (2006.01)
(52) U.S. Cl. .......................... 715/769; 715/777
(58) Field of Classification Search .................. 715/777, 715/769
See application file for complete search history.

(56) References Cited

U.S. PATENT DOCUMENTS

| | | | |
|---|---|---|---|
| 6,122,647 A * | 9/2000 | Horowitz et al. ............. | 715/205 |
| 7,433,876 B2 | 10/2008 | Spivack | |
| 2004/0019611 A1* | 1/2004 | Pearse et al. ................ | 707/104.1 |
| 2006/0136428 A1 | 6/2006 | Syeda-Mahmood | |
| 2007/0050446 A1 | 3/2007 | Moore | |
| 2007/0106650 A1 | 5/2007 | Moore | |
| 2008/0065982 A1* | 3/2008 | Evanchik et al. ............. | 715/255 |
| 2008/0195483 A1 | 8/2008 | Moore | |
| 2008/0270919 A1* | 10/2008 | Kulp et al. .................... | 715/762 |
| 2009/0287559 A1* | 11/2009 | Chen et al. .................... | 715/777 |

OTHER PUBLICATIONS

Iturrioz, Towards Federated Web2.0 sites: the TAGMAS Approach, World Wide Web Conference Committee, WWW 2007, May 8-12, 2007, Banff, Alberta Canada.

* cited by examiner

*Primary Examiner* — Weilun Lo
*Assistant Examiner* — Dino Kujundzic
(74) *Attorney, Agent, or Firm* — David A. Mims, Jr.; Robert V. Wilder

(57) ABSTRACT

A method, programmed medium and system are provided for enabling a user to move a piece of data or context to another page in a mashup application. Rather than linking directly between pages, pages are "linked" by a drag-and-drop action of the user. To move a piece of data or context to another page, the user drags an item from the current mashup page onto the tab of a target page to which the data item is to be moved. The dropping of a text item on, for example, a tab of a target page causes an event to be fired on the target page, which may be wired to widgets contained within the target page. The target tab is then brought into focus and its page contents displayed. Visual indicators are also provided on source pages to indicate the target pages, which will "accept" the dragged contents.

20 Claims, 4 Drawing Sheets

MASHUP APPLICATION PROCESSING SYSTEM

FIELD OF THE INVENTION

The present invention relates generally to information processing systems and more particularly to a methodology and implementation for enabling an improved processing system for Mashup applications.

BACKGROUND OF THE INVENTION

In network web development, a mashup is a Web application that combines data from one or more sources into a single integrated tool. The term Mashup implies easy, fast integration, frequently done by access to open application programming interfaces or APIs and data sources to produce results that were not the original reason for producing the raw source data. An example of a mashup is the use of cartographic data from a mapping program to add location information to real estate or restaurant data, thereby creating a new and distinct Web service that was not originally provided by either source.

Mashups are increasingly being used as an enabling technology or richer portals for building enterprise applications. The basic components of the mashup are widgets and wirings. A widget consists of an embeddable piece of web user interface (UI) function that can communicate with other widgets through "events". A wire is a communication link between two or more widgets. A mashup consists of a definition of widget layout, widget configurations, and wirings. One key tenet of the mashup environment is that the user is empowered to completely customize the UI, including contents, configurations, and wirings. This creates a challenge within environments where the designer of a set of widgets and predetermined page content wishes to enable scenarios that cross between multiple page boundaries. However, the designer cannot link directly between two pages in predetermined content without violating the mashup principle: that page may no longer exist in the user's display environment or may have been completely customized from its original contents. Mashups are very loosely coupled components. The components may come from the same provider (in which case, that provider envisioned how they might work together) or may come from different providers. Since the user creates the content and assembles their own user interface (UI), navigation between widgets cannot be assumed since it is not known how the user will structure the application.

Also, the user may have added their own custom pages and would like those pages to participate in the cross-page interactions. Finally, because these widgets are assembled in a loosely coupled fashion, a user interface paradigm is needed to indicate what information may have possible interactions with other pages.

Thus, there is a need to provide a data input system which is effective to enable computerized device users to quickly customize pages in a mashup application.

SUMMARY OF THE INVENTION

A method, programmed medium and system are provided for enabling a user to move a piece of data or context to another page in a mashup application. Rather than assuming a linkage in the design which links directly between pages, pages are "linked" by a drag-and-drop action of the user. In an illustrated example, to move a piece of data or context to another page, the user drags an item from the current mashup page onto a target transition device, for example onto a page tab of a target page to which the data item is to be moved. The dropping of a text item on a tab of a target page causes an event to be fired on the target page, which may be wired to widgets contained within the target page. The target tab is then brought into focus and its page contents displayed. Visual indicators are also provided on source pages to indicate the target pages, which will "accept" the dragged contents.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
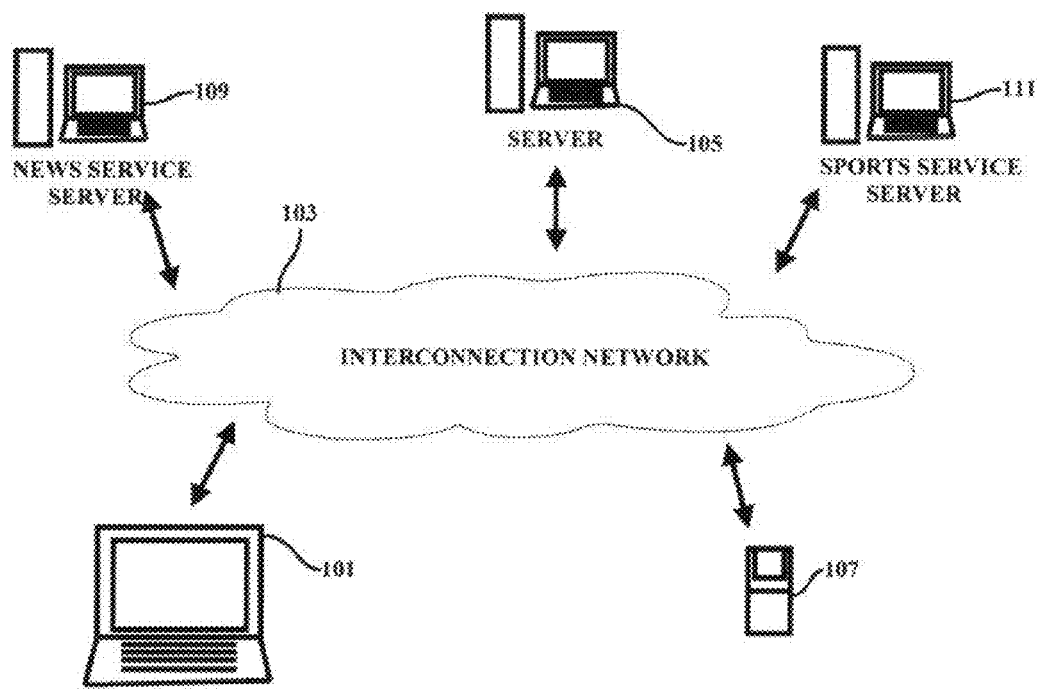
FIG. 1 is an illustration of one embodiment of a system in which the present invention may be implemented.

The various methods discussed herein may be implemented within a computer system which includes processing means, memory, storage means, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a networked computer system using a laptop computer or other portable device, it is understood that disclosed methodology may also be applied in many other available and future devices and systems such as cell phones and personal wireless and other hand-held devices, including any input device, including touch-sensitive screens or touch-sensitive input pads, to achieve the beneficial functional features described herein.

"Mashups" typically communicate using a data model that's exchanged through an event system implemented in JavaScript™. This eventing enables coordinated behavior between multiple widgets within a mashup page. Most mashup environments allow the user to create multiple mashup pages and navigate between those pages via tabs. Mashup editor applications are also available to help users create or edit mashups.

This disclosure describes a method, programmed medium and system for enabling a user to move a piece of data or context to another page in a mashup application. Rather than linking directly between pages, pages are "linked" by a drag-and-drop action of the user. To move a piece of data or context to another page, the user drags an item from the current mashup page onto the tab of a target page to which the data item is to be moved. The contents of the target page are not viewable from the source page which displays only tabs identifying other off-screen target pages. The dropping of a text item on a tab of a target page causes an event to be fired on the target page, which may be wired to widgets contained within the target page. These widgets can then update to the context of the event. The target tab is then brought into focus and its page contents displayed. Another feature notifies a user as to which items are contextual pieces of information that are draggable from a source page to one of one or more target pages to which a highlighted text item of a source page may be moved. This is accomplished, in one example, by using semantic tags to achieve visual highlighting of content within the widget that provide cues to the user as to which items can be dragged. Visual indicators are also provided to indicate the target pages, which will "accept" the dragged contents. This is accomplished through matching semantic information within the tag with the semantic metadata associated with the page. The mashup runtime (typically a JavaScript™ runtime code executing in the browser) can do semantic checking against the pages that are currently displayed within the user's current collection of tabs. Possible page matches can be displayed to the user as a popup when highlighting a mouse over that page.

Semantic tags can be embedded around content within widgets, to be processed by the rendering framework. A typical approach to adding semantic tags is to make use of microformats. Microformats are typically specified either as:
<div class="MicroFormatType" attrib1=value1 attrib2=value2 . . . ></div>
or as xHTML formats:
<nmsp:tagName attrib1=value1 attrib2=value2 . . . ></nmsp:tagName>
Microformat tags can be nested to contain more complex event structures. To achieve the matching described above, the semantic tag can include "terms of understanding" that indicate the nature of the contents within the tag. These terms can be embedded within an attributes on the tag, e.g.: <div class="mashupPageTag" semantics="foo bar"></div> or in more complex structures. These semantic tags get mapped to events and common data structures for signaling the events to allow for inter-page communication. Terms of understanding can be anything from keywords to symbolic URIs to actual RESTful URLs that reference resources associated with the content. The same technique can be applied at the page level, either embedding the microformat tags as part of the page metadata or within the page definition itself (which often is a microformat in a mashup environment). Then, when the user hovers their mouse over the semantic link, the mashup runtime (in JavaScript™, for example) can then do matching between the semantic terms for the content and the semantic terms advertised by the pages on the tab. A popup window can appear under the mouse cursor that lists potential receiving tabs. In addition, an "accept" check can be performed at drag time to make sure that semantic terms match up.

FIG. 1 illustrates an exemplary environment in which the present invention may be implemented. As shown, a user terminal 101, which may be a laptop computer, is connected through an interconnection network 103, such as the Internet, to a server 105. The server 105 may also be accessed from cell phones and other personal wireless devices 107 including screen-sensitive devices. Server 105 may be accessed by the user unit 101 to download or access one or more applications for use and/or input at the user terminal 101/107, and any information input by the user may be uploaded back to the server 105. Server 105 in the example, and/or a user device 101 or 107, is coupled through the network 103 to other information or news service servers 109 and 111 to access current news and other information to selectively display in a mashup application running on user devices 101 and 107.

Figure 2:
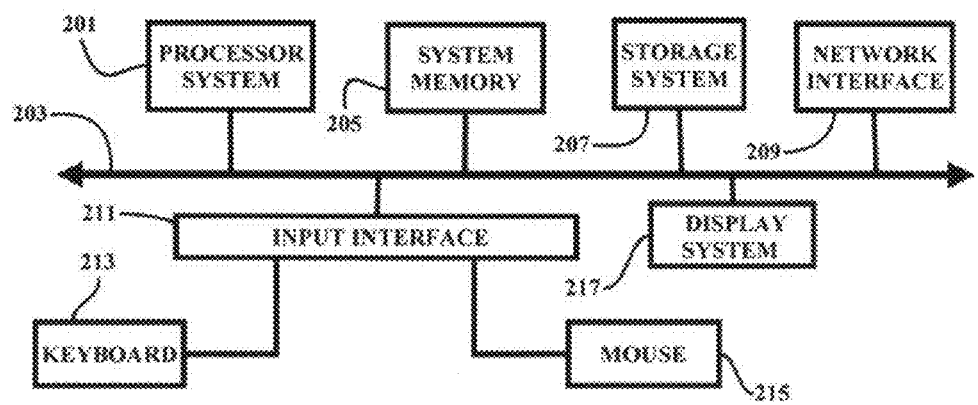
FIG. 2 is a block diagram showing several of the major components of an exemplary system or device using the present invention.

FIG. 2 illustrates several of the major components of a computer system which may be used to implement the present invention. As shown, a processor system 201 is connected to a main bus 203. The main bus 203 is also coupled to, inter alia, system memory 205, a local storage system 207, a network interface 209, an input interface 211 including connections to a keyboard 213 and a mouse or pointing device 215. The main bus is also connected to a display system 217. The input and/or display system may also comprise a touch-sensitive screen or optically-sensitive input pad (not shown).

Figure 3:
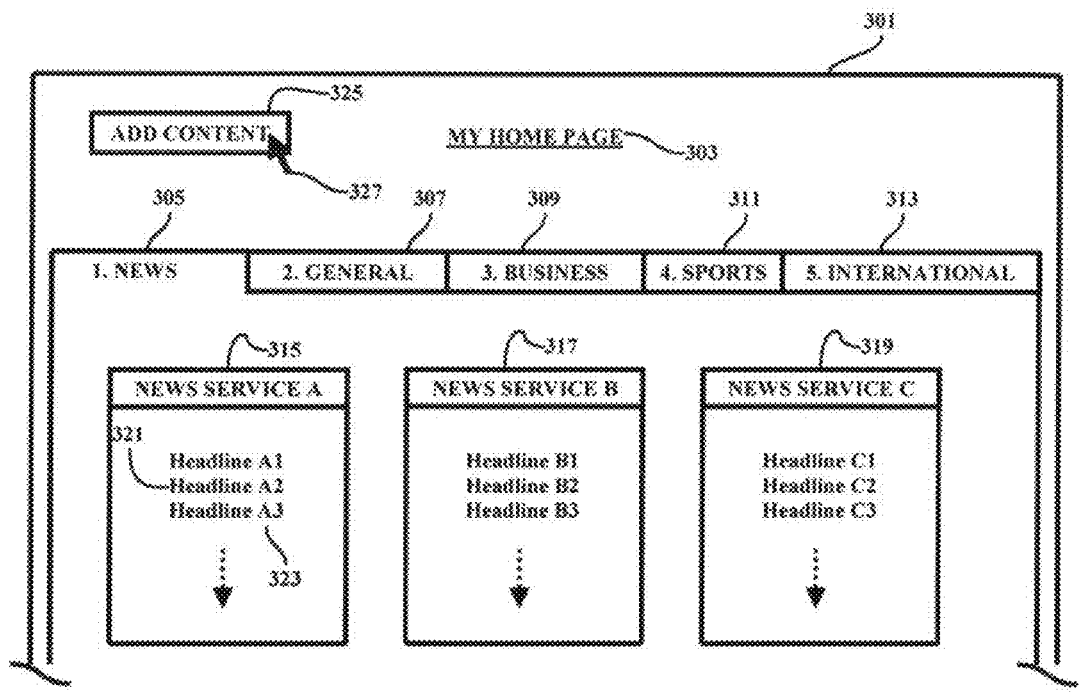
FIG. 3 is an illustration of a screen display showing an exemplary mashup application.

In FIG. 3, there is shown an exemplary home page 303 of a mashup application as presented on a user's display device 301. The page includes tabs including a news service tab 305, a general items tab 307, a business news service tab 309, a sports news service tab 311 and international news service tab 313. Other tabs are available on the world wide web and may be added to the home page 303. As shown, the news service tab 305 is open and includes the widgets from several different news services including news service A 315, news service B 317 and news service C 319. Each widget 315, 317 and 319 includes news headline items which may be different for each widget or news service. Users are able to add additional widgets to their home page by moving a pointer 327 to a block 325 labeled "ADD CONTENT" and actuating a switching device such as a depression button switch on a mouse pointing device.

Figure 4:
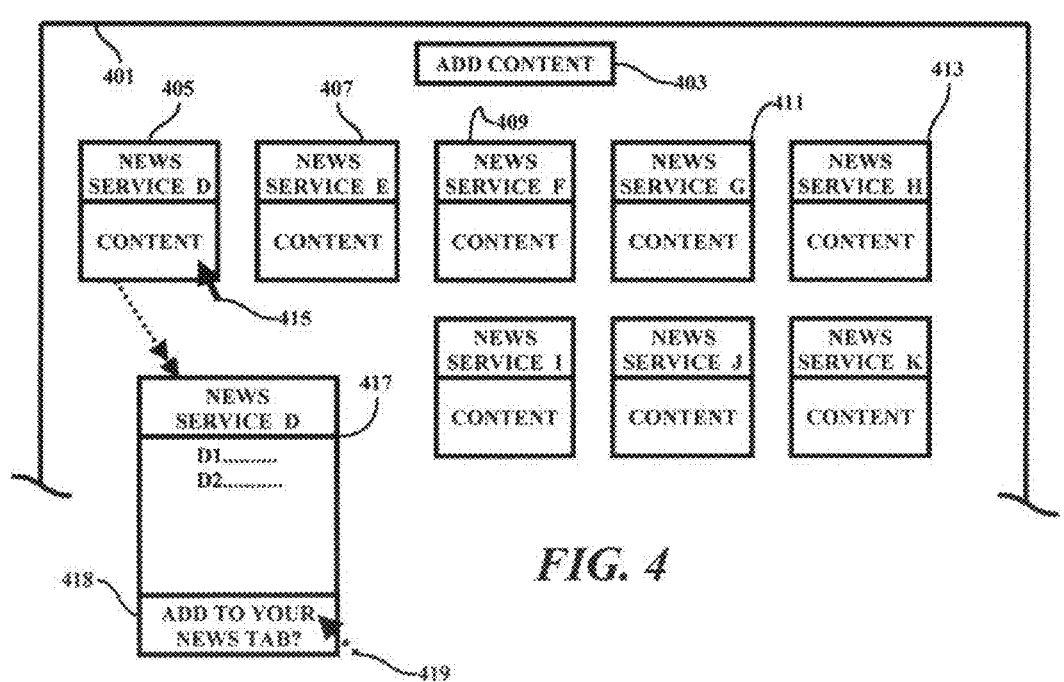
FIG. 4 is an illustration of how pages may be added to a home page in a mashup application.

When the ADD CONTENT 403 function has been selected, the screen 401 shown in FIG. 4 is displayed. As shown, the display includes a plurality of additional news service widget icons 405, 407, 409, 411, 413 etc., which the user may select and add to the user's home page. For example, if a user moves a pointer 415 to icon 405 for news service D and actuates the appropriate mouse button, a pop-up window 417 will be presented showing at least a portion of the detailed headlines of news service D. The user may then select to add the new tab for news service D to the user's home page by "pointing and clicking" on an ADD block 418 as indicated by the reference numeral 419. The current linking process shown in FIG. 4 requires several steps to accomplish the addition of a new widget to a user's home page.

Figure 5:
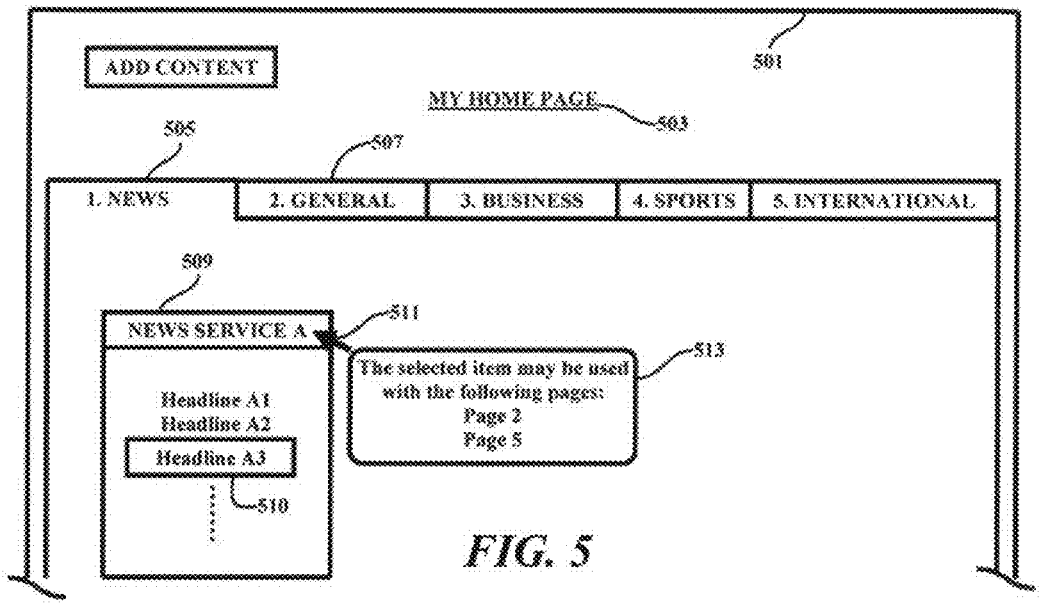
FIG. 5 is an illustration of a screen display showing a partial home page of a mashup application which indicates one feature of the present invention.

In accordance with the present invention, FIG. 5 illustrates a new processing methodology for adding new widget data to a user's home page As shown, a display screen 501 displays a home page 503 which includes a series of tabs 505, 507, etc., and each tab includes one or more subject-related widgets such as News Service A widget 509. When a user hovers over or selects a content 'hot spot' within an existing widget, for example, when a user moves a mouse pointer 511 over a label area or heading for News Service A, an informational pop-up window 513 appears which displays to which pages or tabs any selected data items within the selected widget may be moved. The hot spot itself has some type IDs associated with it that indicate the nature of the data, or the type of event it generates. The other pages are then searched to see which one of those accepts an event of the same type. If a match is detected then it's actionable and the widget may be moved. This informational window methodology has been implemented since not all widget data are or may be movable to all tabs or pages. For example, the content items within a widget might have a ticket number associated with each item. The ticket number may be marked and highlighted as a ticket number. The user is enabled to drag the ticket text onto a tab whose page will display information about the ticket. Once the user is informed as to which tabs or pages the selected data may be moved, if the user wishes to move or copy selected source widget data e.g. 510, to another tab identified in the informational window 513, the user is enabled to use a drag and drop technique to accomplish the desired operation.

Figure 6:
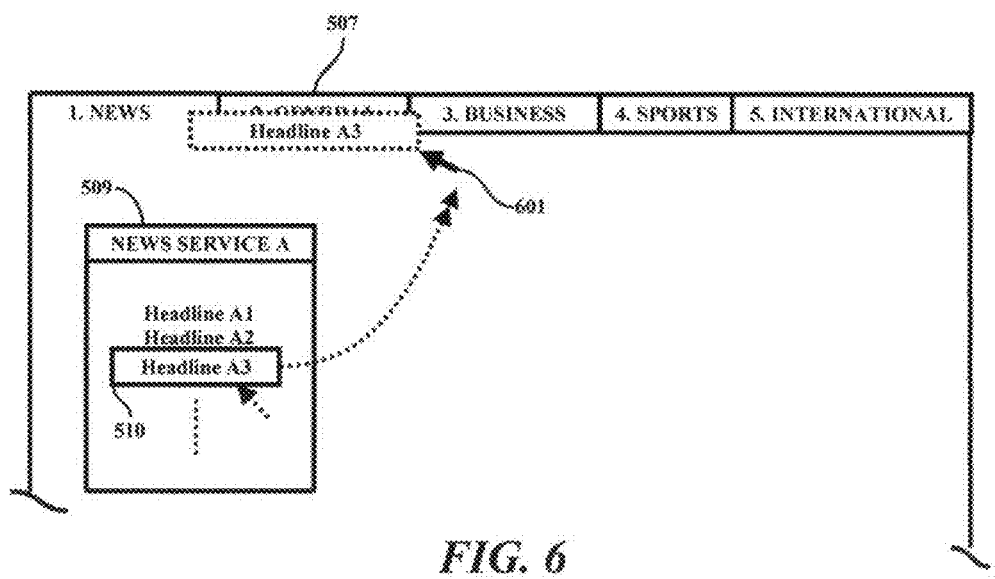
FIG. 6 is an illustration of a screen display showing a partial home page of a mashup application which indicates another feature of the present invention.

As shown in FIG. 5 for example, a user would first be informed from informational window 513 that selected data 510 within source widget 509 may be moved to, inter alia, the "General" tab 507. If the user wishes to move or copy the source widget 509 to the "target tab" e.g. 507, then the user is enabled to accomplish that function using a drag-and-drop operation. For example, the user can highlight a data item 510, and while holding the mouse button in the depressed position, move or drag the selected data item 510 to position 601 (FIG. 6), which is superimposed upon the "General" tab 507. When the user then releases the mouse button, the data item 510 will be moved (or copied) to the General tab 507 home page without requiring further mouse manipulation or manual page-linking by the user. It is also noted that more than one data item may be moved by highlighting and moving or copying all of the data items which are to be moved to another tab.

The widget movement function may also be accomplished by a finger or stylus movement of a user when using a touch-sensitive screen device by moving the selected widget inside of a predetermined screen area in proximity to the selected tab, and then removing the finger from the touch-sensitive screen, which would trigger the event copying or moving the selected widget to the selected target page.

Figure 7:
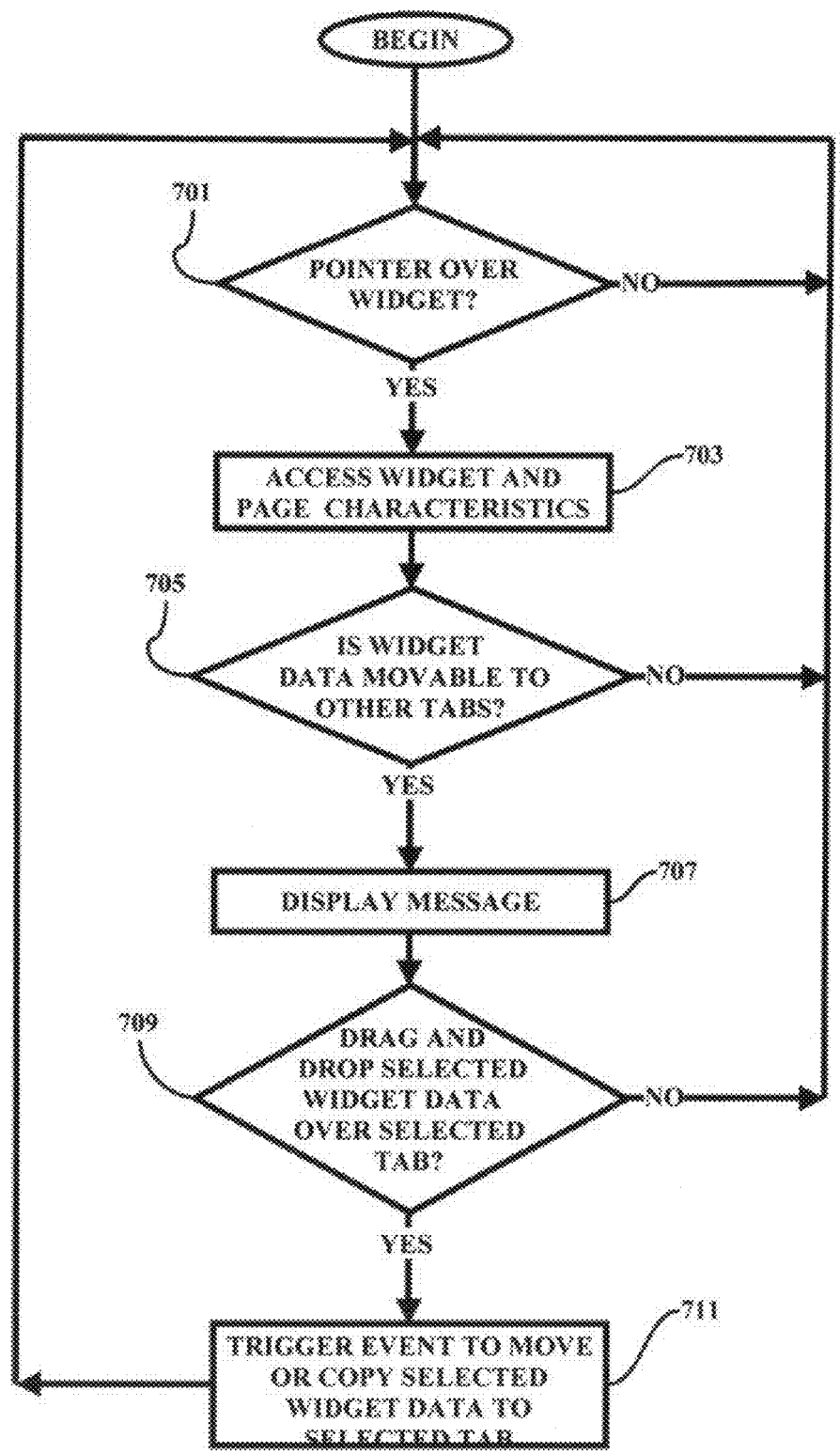
FIG. 7 is a flow chart illustrating an exemplary sequence of operations which may be implemented in accordance with the present invention.

FIG. 7 illustrates a flow chart describing an exemplary operational sequence which may be implemented in code to accomplish the results described above. As shown, when a pointer is positioned above a widget 701, the widget and page characteristics of that widget are accessed 703 and it is determined whether or not the selected source widget data may be moved to any target tabs or pages 705. The matching process needs to take into account the semantic tag IDs that indicate the nature of the content. If the selected widget data item is movable to another tab or page 705 then the informational message (513 FIG. 5) is displayed 707. If the source widget data is then dragged and dropped over a target tab, for example, to which the source widget may be moved or copied 709, then an event is triggered to effect the movement of the source or selected data item to the selected target tab home page 711.

It is understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including any portable or fixed, volatile or non-volatile memory media device, including CDs, RAM and "Flash" memory, or other semiconductor, optical, magnetic or other memory media capable of storing code, from which it may be loaded and/or transmitted into other media and executed to achieve the beneficial results as described herein. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing widget management in a mashup environment, said method comprising:
   displaying a first mashup page including one or more widgets on a display screen of a user;
   detecting when a first widget has been selected by said user;
   determining available mashup pages in said mashup environment;
   filtering said available mashup pages to determine receptive mashup pages in said mashup environment to which selected data within said first widget can be moved; and
   displaying a visual indicium on said display screen of said user, said visual indicium providing notice to said user identifying only said receptive mashup pages to which said selected data within said first widget can be selectively moved by said user.

2. The method as set forth in claim 1 and further including:
   providing widget movement enabling device by which said user is enabled to move said selected data to one or more of said receptive mashup pages.

3. The method as set forth in claim 2 and further including:
   enabling said user to move said selected data within said first widget to within a predetermined screen area relative to a selected tab presented on said first mashup page, said selected tab being representative of one of said receptive mashup pages to which said selected data may be moved;
   detecting a presence of said selected data within said first widget being within said predetermined screen area relative to said selected tab; and
   enabling a movement of said selected data, or a copy of said selected data, to said receptive mashup page represented by said selected tab.

4. The method as set forth in claim 3 wherein said first widget is selected by detecting a presence of a display screen pointer indicium within a predetermined screen area containing said first widget.

5. The method as set forth in claim 4 and further including enabling a user to use a mouse device to move said pointer indicium on said display screen.

6. The method as set forth in claim 4 and further including enabling a user to use a touchpad device to move said pointer indicium on said display screen.

7. The method as set forth in claim 1 and further including enabling a user to use a touch-sensitive display screen to select said first widget.

8. The method as set forth in claim 1 and further including enabling a user to use a touch-sensitive display screen to move said selected data.

9. The method as set forth in claim 8 wherein movement of said selected data, or a copy of said selected data to said receptive mashup page is initiated by a detection of a release of a touching of said touch-sensitive display screen.

10. A computer program product comprising a computer-readable, tangible storage device(s) and computer-readable program instructions stored on the computer-readable, tangible storage device(s) for enabling widget management in a mashup environment, the computer-readable program instructions, when executed by a processing system, being operable for implementing a method comprising:
    displaying a first mashup page including one or more widgets on a display screen of a user;
    detecting when a first widget has been selected by said user;
    determining available mashup pages in said mashup environment;
    filtering said available mashup pages to determine receptive mashup pages in said mashup environment to which selected data within said first widget can be moved; and
    displaying a visual indicium on said display screen of said user, said visual indicium providing notice to said user identifying only said receptive mashup pages to which said selected data within said first widget can be selectively moved by said user.

11. The computer program product as set forth in claim 10 wherein said method further includes:
    enabling said user to move said selected data to one or more of said receptive mashup pages.

12. The computer program product as set forth in claim 11 wherein said method further includes:
    enabling said user to move said selected data within said first widget to within a predetermined screen area relative to a selected tab presented on said first mashup page, said selected tab being representative of one of said receptive mashup pages to which said selected data within said first widget can be moved;
    detecting a presence of said selected data within said first widget to be within a predetermined screen area relative to said selected tab; and
    enabling a movement of said selected data, or a copy of said selected data, to said receptive mashup page represented by said selected tab.

13. The computer program product as set forth in claim 12 wherein said first widget is selected by detecting a presence of a display screen pointer indicium within a predetermined screen area containing said first widget.

14. The computer program product as set forth in claim 13 wherein method further includes:
    enabling a user to use a mouse device to move said pointer indicium on said display screen.

15. The computer program product as set forth in claim 13 wherein said method further includes:
    enabling a user to use a touchpad device to move said pointer indicium on said display screen.

16. The computer program product as set forth in claim 10 wherein said method further includes:
    enabling a user to use a touch-sensitive display screen to select said first widget.

17. The computer program product as set forth in claim 10 wherein said method further includes:
    enabling a user to use a touch-sensitive display screen to move said selected data.

18. The computer program product as set forth in claim 17 wherein movement of said selected data, or a copy of said selected data to said receptive mashup page is initiated by a detection of a release of a touching of said touch-sensitive display screen.

19. A system for processing widget management in a mashup environment, said system comprising:
    a display device for displaying a first mashup page including one or more widgets on a display screen of a user;
    means for detecting when a first widget has been selected by said user;
    processing means for determining available mashup pages in said mashup environment;
    said processing means being further operable for filtering said available mashup pages to determine receptive mashup pages in said mashup environment to which selected data within said first widget can be moved, said display device being operable for displaying a visual indicium on said display screen of said user, said visual indicium providing notice to said user identifying only said receptive mashup pages to which said selected data within said first widget can be selectively moved by said user.

20. The system as set forth in claim 19 and further including:
    user input device for enabling said user to move said selected data within said first widget to within a predetermined screen area relative to a selected tab presented on said first mashup page;
    means for detecting a presence of said selected data within said first widget being within said predetermined screen area relative to said selected tab; and
    means for enabling a movement of said selected data, or a copy of said selected data, to said receptive mashup page represented by said selected tab.

* * * * *